United States Patent [19]
Markey

[11] 3,921,686
[45] Nov. 25, 1975

[54] LAMINATED NUT AND CLIP

[75] Inventor: Robert Harvey Markey, Warren, Mich.

[73] Assignee: Multifastener Corporation, Detroit, Mich.

[22] Filed: Aug. 15, 1974

[21] Appl. No.: 497,812

[52] U.S. Cl. .................. 151/21 C; 151/41.75
[51] Int. Cl.² ..................................... F16B 39/28
[58] Field of Search ............ 151/41.75, 21 C, 21 R, 151/30, 14 R; 85/32 CS, 32 V

[56] References Cited
UNITED STATES PATENTS

| 2,228,584 | 1/1941 | Place 151 | 41.75/ |
| 2,581,641 | 1/1952 | Forgaard | 151/21 C |
| 3,362,278 | 1/1968 | Munse | 151/41.75 |
| 3,388,732 | 6/1968 | Holton | 151/41.75 |
| 3,426,818 | 2/1969 | Derby | 151/41.75 |
| 3,576,205 | 4/1971 | Reich | 85/32 R |

FOREIGN PATENTS OR APPLICATIONS

| 10,867 | 5/1902 | United Kingdom | 151/21 R |
| 28,697 | 12/1903 | United Kingdom | 151/21 C |

Primary Examiner—Marion Parsons, Jr.
Attorney, Agent, or Firm—Cullen, Settle, Sloman & Cantor

[57] ABSTRACT

A nut formed of a plurality of laminae relatively fixed at their opposite ends, in face to face relation, having an integral barrel portion surrounding a threaded bore. The barrel portion is defined by nested cone-shaped portions formed in the laminae and the threads of the bore are formed in the edges surrounding the bore. In the preferred embodiment, the laminae are formed from a spirally folded strip and a U-shaped clip portion is formed in the end of the strip.

12 Claims, 8 Drawing Figures

LAMINATED NUT AND CLIP

FIELD OF THE INVENTION

The nut and clip of this invention is an improvement of the Nut, Clip and Panel Assembly disclosed in a copending application for U.S. patent, Ser. No. 454,056, filed Mar. 25, 1974, assigned to the Assignee of the instant application.

A nut clip is generally utilized to secure a panel or other structural member to a second panel in generally face to face relation. The present commercial nut clips include a U-shaped clip and a conventional nut secured at one end of the clip. The nut may be welded or staked to the clip, such as shown in U.S. Pat. No. 3,091,272. Integral nut clips have also been suggested by the prior art, including nut clips formed from a continuous strip of sheet material. For example, U.S. Pat. Nos. 2,228,584, 3,123,880 and Reissue 21,769 each disclose nut clips having one or more spaced convolutions. The pull-out strength of such structures is however limited and the clip must be used in less severe applications than the nut clip of the present invention. U.S. Pat. Nos. 2,224,823 and 2,343,947 disclose nut-like elements which are formed from a strip of sheet material.

The nut and nut clip of this invention is particularly adapted to overcome the disadvantages of the nut clips disclosed in the prior art and is a further improvement of the nut clip disclosed in the above referenced copending application for U.S. patent.

SUMMARY OF THE INVENTION

The preferred embodiment of the nut of this invention includes a plurality of laminae, relatively fixed at opposed edges and a barrel portion integrally formed from the laminae having a threaded bore. Each lamina has an integral truncated cone-shaped portion having an open end which are nested to define the barrel portion of the nut and the bore. The barrel portion then includes an annular bearing portion at the base of the cone-shaped portions having a lead-in to the threaded bore. The opposed end, generally referred to as the barrel, has a flat annular end.

The cone-shaped construction of the barrel significantly improves the pull-out strength of the nut and is more easily tapped than the bow-shaped nut disclosed in the above referenced copending application for U.S. patent. The internal diameter of the barrel is threaded, preferably by rolling, to provide the threaded bore. The cone angle provides additional pull-out strength for the nut and the thickness of the laminae may be substantially equal to the width of one thread of the bolt, at the defined angle. In this manner, the crest of each female thread may be substantially supported on one lamina, promoting individual flexing of the laminae during final torquing, although it will be understood that this is an ideal condition.

The nut and nut clip of this invention may be formed from a continuous strip of sheet material, preferably a resilient sheet metal, such as stainless steel. The strip is spirally inter-folded upon itself and flattened, with the interior faces of each lamina in face to face contact and the end of the strip received within the fold of the adjacent exterior laminae. The disclosed nut clip includes an integral U-shaped clip portion which extends beneath the bearing portion of the nut and retains the nut clip to a panel or structural member prior to securement.

As a bolt is threaded into the nut bore and torqued in place, the laminae act as a single unit because of the face to face contact and the spiral thread of the bore. During final torquing of the bolt, the annular bearing face of the nut is biased against the supporting panel, resiliently flexing the cone-shaped portions of the nut barrel against the bolt. The laminae then provide independent spring movement and are flexed into the root portions of the male threaded bolt, providing an anti-backoff feature. In final assembly, the laminae function as leaves of a spring, resisting unthreading of the bolt such as may be caused by vibration or the like. The cone-shaped construction of the nut of this invention further provides additional strength such that the laminated nut of this invention meets the normal torque requirements of a conventional nut and additionally provides the anti-backoff feature described. Further, the cone-shaped construction provides a lead-in for both threading of the bore and for the bolt or male threaded member in final assembly. The flat barrel end is also stronger than the arched or bow-shaped nut disclosed in the above referenced copending application.

Other advantages and meritorious features of the nut and nut clip of this invention will be more fully understood from the following description of the preferred embodiments, the attached drawings and the appended claims.

DESCRIPTION OF THE PREFERRED EMBODIMENTS

Figure 1:
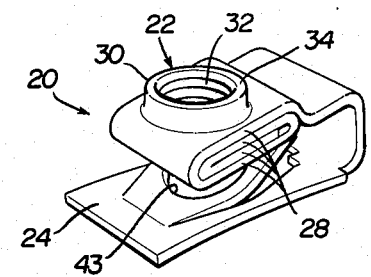
FIG. 1 is a top perspective view of one embodiment of the nut clip of this invention.
Figure 2:
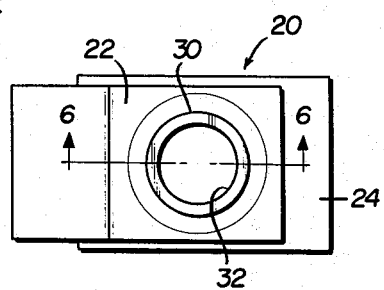
FIG. 2 is a top elevation of the nut clip shown in FIG. 1.
Figure 3:
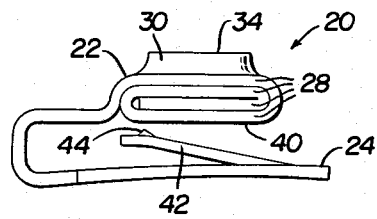
FIG. 3 is a side view of the nut clip shown in FIGS. 1 and 2.
Figure 4:
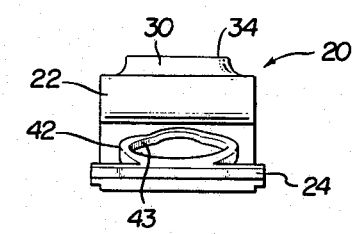
FIG. 4 is an end view of the nut clip shown in FIGS. 1 to 3.
Figure 5:
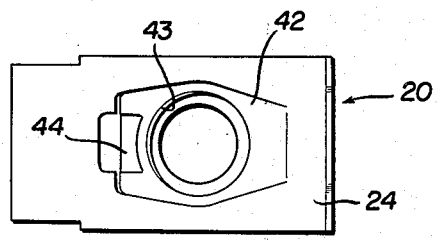
FIG. 5 is a bottom view of the nut clip shown in FIGS. 1 to 4.
Figure 6:
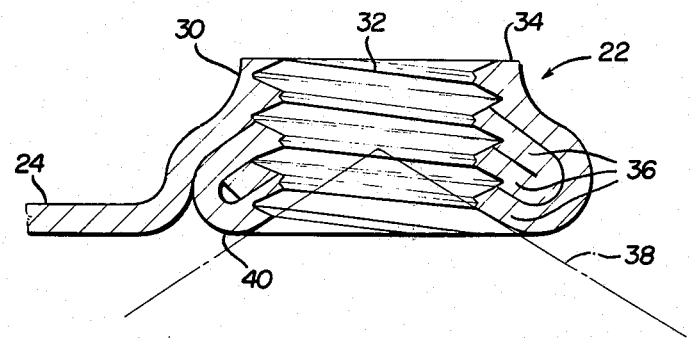
FIG. 6 is a partial, side cross-sectional view of the nut portion of the nut clip shown in FIG. 2, in the direction of view arrows 6—6.

The nut clip 20 shown in FIGS. 1 to 5 includes a nut portion 22 and a clip portion 24. The disclosed nut portion is formed of a plurality of laminae 28, as best shown in FIGS. 1, 3 and 6. The disclosed nut clip may be formed from a single strip of sheet material which is spirally interfolded in face to face contact. The disclosed embodiment of the nut portion includes four interfolded laminae, which is particularly suitable in conventional nut applications. In the preferred embodiment of the interfoled nut clip, one end of the strip is folded within the folds of the adjacent laminae as shown in FIGS. 1 and 3, such that the laminae act as a single or integral unit during receipt of a bolt and preventing separation of the laminae during tapping and assembly, as described hereinbelow. The preferred embodiment of the nut portion then includes at least three laminae, although the nut portion may include more than four laminae in certain applications.

The preferred embodiment of the nut portion includes an integral barrel portion 30 surrounding a theaded bore 32. As best shown in FIG. 1, the nut portion 22 is generally flat and the barrel portion 30 projects from the relatively flat laminae. The projecting barrel portion 30 is generally cylindrical in the disclosed embodiment having a generally flat annular end 34. The construction of the barrel portion of the nut clip of this invention provides several advantages over the prior art, as will now be described.

As best shown in FIG. 6, the barrel portion is comprised of a plurality of nested truncated cone-shaped portions 36 which are integrally formed in each of the relatively flat laminae. The cone angle of the bottom lamina is shown at 38. The cone-shaped portions are preferably nested in face to face contact, as shown, and the female thread of the bore 32 is preferably rolled in the bore to prevent burrs or chips which may tend to separate the laminae. The cone angle 38 thus provides a lead-in for the thread rolling tool and for the bolt or male threaded fastener in assembly.

The clip portion 24 in the preferred form of the nut clip is integral with the laminated nut portion as best shown in FIGS. 1 and 6. As shown, the clip portion 24 is generally U-shaped and extends beneath the bearing surface 40 of the nut portion 22. In the disclosed embodiment, the clip portion includes an integrally struck tang 42 which extends toward the bearing surface 40 of the nut portion 22 to retain the nut clip on a panel or structural member prior to final assembly. The tang includes an aperture 43 and a locking edge 44 as best shown in FIGS. 3 and 5 to aid in the retention of the nut clip on the panel.

The nut clip of this invention may be formed from various materials depending upon the particular application. As described, the nut clip is preferably formed from a continuous strip of resilient metal, such that the cone-shaped portions 36 will individually flex upon final torquing as described below. A suitable material for the nut clip of this invention is spring steel, such as 1050 or 1065 carbon steel, which may be later heat treated to improve the structural advantages of the nut clip of this invention, including reducing any permanent deflection or deformation of the laminae. The nut clip may also be phosphated, if desired.

Figure 7:
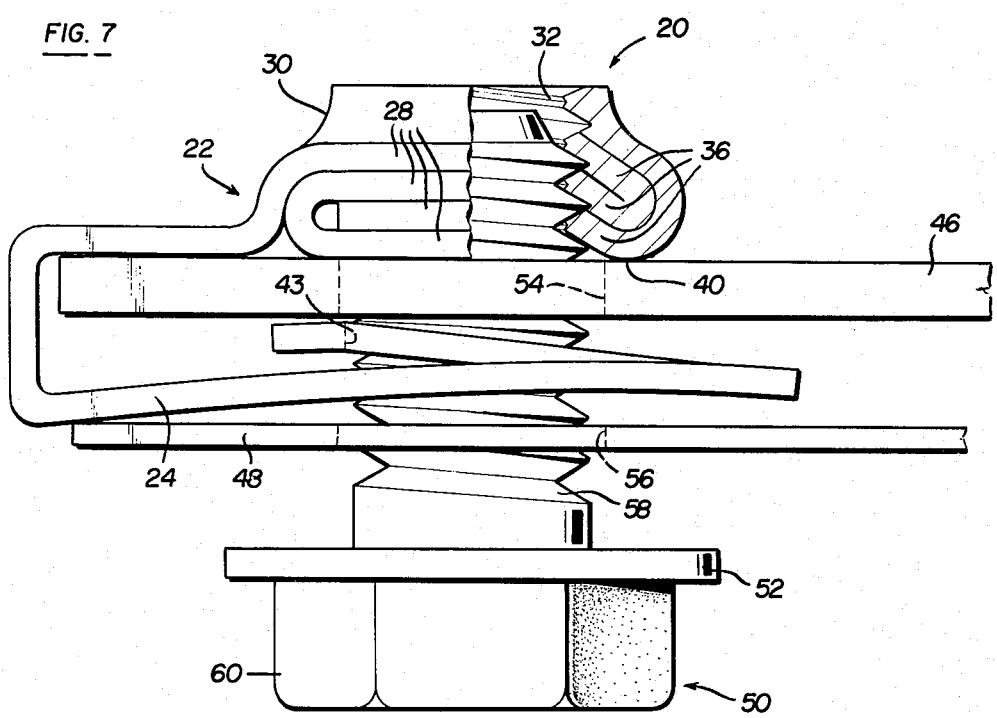
FIG. 7 is a side view, partially cross-sectioned, of a structural assembly including the nut clip shown in FIGS. 1 to 6.

A typical structural assembly utilizing the clip nut 20 of this invention is shown in FIG. 7. The structural assembly includes the clip nut 20, a first panel member 46, a second panel member 48 and a bolt 50 having a washer 52 securing the panel assembly. The panels 46 and 48 may be part of any structural assembly wherein the elements are to be secured together in generally face to face relation. For example, the panel 46 may be a metal body panel for an automobile and the panel 48 may be a structural member which is to be secured to the automotive body panel. The panels 46 and 48 each include a circular aperture, 54 and 56 respectively, for receipt of the bolt. The bolt includes a threaded shank 58 and an enlarged hexagonal head 60. It will be understood that the bolt 50 may be any male threaded member in the structural assembly disclosed.

The clip nut 20 is first assembled on the primary panel 46 with the threaded aperture 32 of the nut portion 22 and the aperture 43 of the tang in registry with the aperture 54 in the panel. The secondary panel 48 is then disposed against the clip portion 24 with the aperture 56 generally coaxially aligned with the apertures in the nut clip and the panel 46. The threaded shank 58 of the bolt 50 is then received through the aperture 56 in the secondary panel, the aperture 43 and the clip portion 24, the aperture 54 in the primary panel and threadably received in the bore 32 of the nut portion 22. The lead-in angle 38 guides the bolt into the nut portion. As shown in FIG. 7, the laminae of the nut portion function as a single unit during the initial threading of the male threaded shank 58 in the nut portion. It will be understood that the crest of the female threads are normally spaced from the root portion of the male threads during the initial threading and the threaded shank is loosely received in the female thread due to the normal tolerances between a male and female thread.

Figure 8:
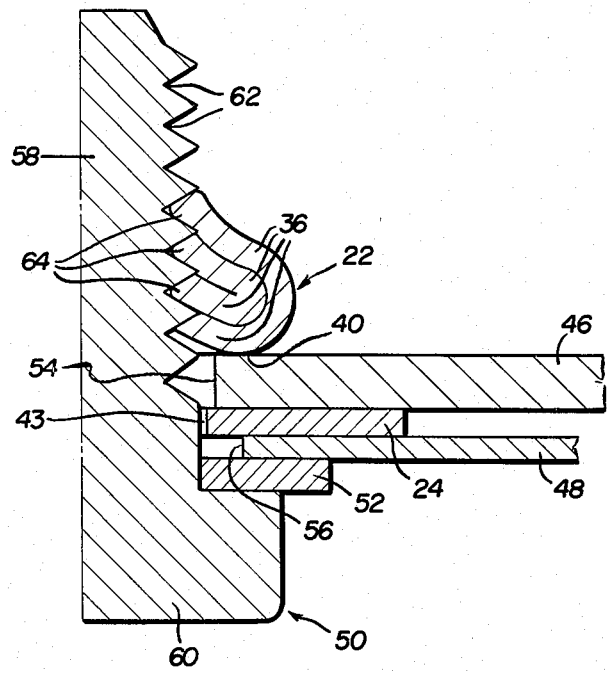
FIG. 8 is a partial, cross-sectional view of the structural assembly shown in FIG. 7, after completing torquing of the bolt.

During the final torquing of the bolt however the laminae are caused to individually resiliently flex as shown in FIG. 8. During final torquing, the annular bearing face 40 of the nut portion 22 is biased downwardly, by the threading of the bolt 50, against the reaction of the bolt head 60. The bearing face 40 thus serves as a fulcrum for the resilient laminae, which now act as the leaves of a spring. The cone-shaped portions 36 are thereby flexed downwardly and into the roots 62 of the male threaded shank 58, providing an anti-back-off feature. As shown in FIG. 8, the crests 64 of the female threaded bore 32 are biased inwardly, into the root portions 62 of the male threaded shank, limiting unthreading of the bolt under vibrational loads and inhibiting unthreading of the nut, as may be desired in many applications. Further, upon unthreading of the bolt, the cone-shaped portions 36 will resiliently return to their original position, permitting reuse of the clip. The improved nut clip of this invention also has a greater pull-out strength and proof load than the integral nut clips shown in the prior art.

It will be understood that the nut clip of this invention may be modified without departing from the perview of the appended claims. For example, the nut portion 22 may be used as a nut, eliminating the clip portion 24. Further, the tang 42 may be eliminated in certain applications.

I claim:

1. A nut formed of a continuous strip of resilient sheet metal, said strip being spirally folded to define four lamina in face to face contact with a strip end retained within the folds of the strip, a barrel portion integrally formed in said laminae having a continuous pilot portion extending from the plane of said laminae and a continuous female threaded bore through said barrel portion, each of said lamina having an integral continuous cone-shaped portion projecting into said barrel portion, said cone-shaped portions nested in face to face contact with the female threaded bore through said cone-shaped portions.

2. The nut defined in claim 1, characterized in that said cone-shaped portions extending from adjacent the folds in said strip and said folds being U-shaped defining bearing supports for said cone-shaped portions upon receipt of a male threaded member in said threaded bore.

3. The nut defined in claim 2, wherein the cone-shaped portion of the lamina opposite said barrel portion provides a lead-in angle for a male threaded member adjacent the U-shaped fold of said lamina.

4. The nut defined in claim 1, wherein the free end of said laminae is received beneath the concave face of the cone-shaped portion to define a U-shaped clip portion.

5. The nut defined in claim 1, wherein said barrel end is annular and flat.

6. The nut defined in claim 1, in combination with a bolt and panel assembly, said panel having an aperture and a bolt received through said aperture and threadably received in said female thread of said nut, the concave face of said cone-shaped portion providing a continuous circular bearing area in bearing contact with said panel and said bolt resiliently flexing said laminae into the bolt threads, acting against said bearing areas.

7. A nut comprising a continuous strip of resilient sheet material having at least four spirally interfolded and generally flat lamina, a spirally threaded bore through said laminae, an integral barrel portion extending from the flat portion of said laminae surrounding said bore having a flat end portion projecting from the outer face of one outer lamina and said laminae each having a continuous cone-shaped portion, said cone-shaped portions nested and projecting into said barrel portion in face to face contact, said spiral thread defined on the edges of said laminae and a circular bearing portion surrounding said bore defined on the outer lamina opposite said barrel portion end.

8. The nut-clip defined in claim 7, including a structural member received within said U-shaped clip portion and a bolt received through said structural member and threadably received within said nut bore, the base of said cone-shaped lamina bearing against said structural member and said bolt resiliently flexing said cone-shaped portions into the male threaded bolt against said bearing portions.

9. An integral nut-clip, comprising a continuous strip of resilient sheet metal including a nut portion and a clip portion, said nut portion including at least four spirally interfolded laminae with one strip end received within the fold of the outer adjacent lamina, each lamina including a hole and a cone-shaped portion surrounding said hole, said cone-shaped portions nested in face to face contact, with the holes coaxially aligned to define a nut bore and a continuous spiral female thread in said nut bore, said cone-shaped portions extending from adjacent the folds in said strip and said folds being U-shaped, defining bearing supports for said cone-shaped portions and said clip portion comprising the free end of said liminae disposed beneath the concave face of said nut bore.

10. A integral nut-clip defined in claim 9, including a barrel portion projecting from the face of an outer lamina continuous with the minor diameter of one of said cone-shaped portions.

11. A nut, comprising a continuous strip of resilient sheet metal spirally interfolded to define at least four lamina with the strip end retained within the fold of the outer adjacent lamina, a barrel portion integrally formed in said lamina, comprising a truncated continuous cone-shaped portion in each of said lamina, said cone-shaped portions internested in face to face contact, a continuous spirally threaded bore through said cone-shaped portions, said cone-shaped portions extending from adjacent the folds in said strip and said folds being U-shaped to define a continuous circular bearing area for said cone-shaped portions upon receipt of a male threaded member in said bore.

12. The nut defined in claim 11, characterized by the free end of said laminae extending beneath said barrel portion and providing an integral U-shaped clip portion.

* * * * *